April 7, 1936. F. A. MAXFIELD ET AL 2,036,227
RESISTOR IN IGNITER CIRCUITS
Filed Feb. 14, 1934

WITNESSES:
E.A. McCloskey
S. A. Stricklett

INVENTORS.
Frederick A. Maxfield
and Lloyd W. Smede.
BY
A.B. Buchanan
ATTORNEY

Patented Apr. 7, 1936

2,036,227

UNITED STATES PATENT OFFICE 2,036,227

RESISTOR IN IGNITER CIRCUITS

Frederick A. Maxfield, Wilkinsburg, and Lloyd W. Smede, Pittsburgh, Pa., assignors to Westinghouse Electric & Manufacturing Company, East Pittsburgh, Pa., a corporation of Pennsylvania Application February 14, 1934, Serial No. 711,186

4 Claims. (Cl. 250—27.5)

Our invention relates to a vapor-electric converter and particularly to a make-alive circuit for such a converter.

In the operation of vapor-electric converters of the make-alive type, it has been discovered that with certain tube constructions and with certain load characteristics, there is a tendency to delay the initiating of the main rectifying arc after the make-alive has established the cathode spot. With certain tube formations, the voltage necessary to establish an arc between the anode and the cathode frequently exceeds the voltage drop through the make-alive circuit. In these cases, there is a tendency for the entire load current to flow through the make-alive circuit with consequent danger of damage to the make-alive electrode and the device associated therewith also for certain types of load it has been found that the load current builds up so slowly that the main rectifying arc is not established until after the instant of ignition caused by the current flowing through the make-alive electrode.

It is an object of our invention to provide a make-alive circuit which will maintain a sufficient difference of potential between the anode and the cathode to insure the rectifying arc being struck therebetween.

It is a further object of our invention to provide a make-alive system in which the current flowing in the make-alive electrode is reduced to a minimum.

Further objects and advantages of our invention will be apparent from the following detailed description taken in conjunction with the accompanying drawing, in which.

Figure 1:
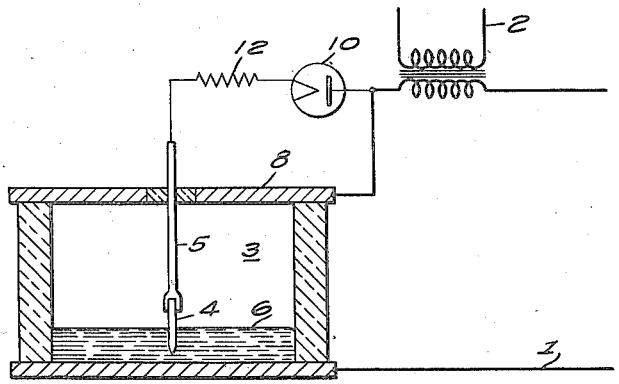
Figure 1 is a schematic illustration of a make-alive converter embodying our invention.

The apparatus according to our invention comprises a direct-current system 1 and an alternating-current system 2 connected by means of a vapor-electric converter 3 of the make-alive type. A make-alive according to our invention comprises an auxiliary electrode 4 of suitable resistance material such as carborundum or boron carbide.

This make-alive electrode is mounted in a suitable holder of metal, graphite or other material capable of acting as an auxiliary anode for the vapor-electric device. This auxiliary or make-alive electrode 4 is so positioned that at least a portion of the make-alive electrode 4 is immersed in the cathode material 6 of the converter 3.

The make-alive electrode 4 is connected to the main anode 8 of the converter 3 through a suitable uni-directional conductor such as a rectifying tube 10.

In the operation of the device, as described, the auxiliary discharge device 10 will break down when positive potential is applied to the main anode 8 and allow current to flow through the make-alive electrode 4. When sufficient current flows through this electrode 4, there will be a reaction at the junction of the make-alive electrode 4 and the main cathode 6 which will produce a cathode spot.

If, at this time, there is sufficient potential on the main anode 8, the rectifying arc will immediately establish to the main anode. However, if for any reason there is not sufficient potential available to strike a main rectifying arc, an arc will strike from the auxiliary electrode holder 5 to the mercury cathode 6. When this happens, current will continue to flow through the make-alive circuit and the anode 8 will be above cathode potential only by the amount of the arc drops in the auxiliary rectifier 10 and the arc between the electrode holder 5 and the main cathode 6.

Figure 3:
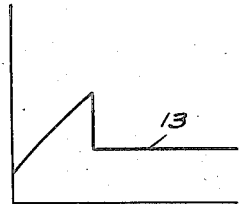
Fig. 3 is a voltampere characteristic of the previous type of make-alive starters.

This voltage characteristics is illustrated at 13 in Fig. 3. A continuance of flow of current in the make-alive circuit is not only dangerous to the auxiliary tube 10, but may seriously damage the make-alive electrode 4 and its associated holder 5.

In order to eliminate this difficulty, we have placed a resistor 12 in the make-alive circuit so that when current flows through the auxiliary rectifier 10 and as an arc from the make-alive electrode holder 5 to the cathode 6, there will be an additional voltage impressed between the anode 8 and cathode 6 by the IR drop in this resistor 12.

Figure 4:
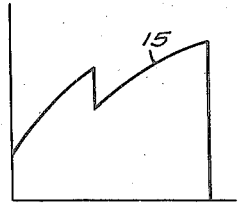
Fig. 4 is a voltage ampere characteristic according to the modification of our invention shown in Fig. 1.

As shown in Fig. 4, this will produce a constantly increasing difference in potential, as shown at 18, between the cathode 6 and the anode 8 until there is sufficient potential to establish a rectifying arc between the main anode 8 and cathode 6.

Figure 2:
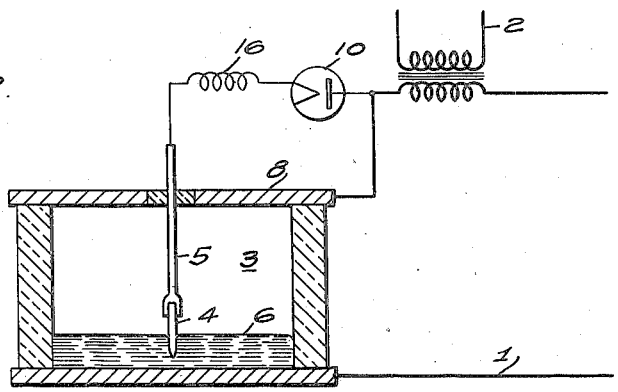
Fig. 2 is a similar view of a modified circuit according to our invention.

In the modification of our invention, according to Fig. 2, the potential between the anode 8 and cathode 6 is established by means of a reactor 16 in series with the make-alive electrode 4.

Figure 5:
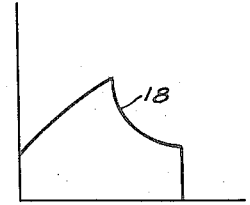
Fig. 5 is a similar diagram of the modification shown in Fig. 2.

As is shown at 18 in Fig. 5, this reactor 16 maintains a large difference in potential between the anode 8 and cathode 6 for a sufficient length of time to enable the main rectifying arc to be established. Tests have indicated that it is only necessary to use sufficient reactance to maintain striking potential on the main anode 8 for a time of the order of 100 micro-seconds.

While we prefer to use an external resistor 12 for increasing the potential available for initiating the main current carrying arc between anode 8 and cathode 6, quite satisfactory results were obtained by replacing the auxiliary discharge device 10 with a discharge device such as a gas-filled tube having a high arc drop which is effective to raise the characteristic 13 of Fig. 3 to a value high enough to insure striking of the main arc.

While we have shown and described specific modifications of our invention, it will be apparent to those skilled in the art that changes and modifications can be made therein without departing from the true spirit of our invention or the scope of the accompanying claims.

We claim as our invention:

1. A control system for a make-alive type of converter comprising a make-alive electrode, a holder for said electrode adapted to act as an auxiliary anode, a circuit connecting said auxiliary anode to the main anode, an auxiliary discharge device in said circuit for preventing reverse current flow in said circuit and a reactor in said circuit for increasing the time interval during which the main anode may pick up.

2. A control system for a make-alive type of converter comprising a make-alive electrode, a holder for said electrode adapted to act as an auxiliary anode, a circuit connecting said auxiliary anode to the main anode, an auxiliary discharge device in said circuit for preventing reverse current flow in said circuit, said discharge device having a high arc-drop for insuring pick up of the main anode.

3. An electric conversion system comprising a converter having a main anode and cathode, an alternating-current system connected to said anode, a direct-current system supplied by said converter, a make-alive electrode in said converter, said electrode being in contact with said main cathode, a holder for said make-alive electrode adapted to act as an auxiliary anode in said device, a connection from said holder to said main anode, a unidirectional conductor in said connection and a resistor in said connection for transferring an arc from said holder to said main anode.

4. An electric conversion system comprising a converter having a main anode and cathode, an alternating-current system connected to said anode, a direct-current system supplied by said converter, a make-alive electrode in said converter, said electrode being in contact with said main cathode, a holder for said make-alive electrode adapted to act as an auxiliary anode in said device, a connection from said holder to said main anode, a unidirectional conductor in said connection, said unidirectional conductor having a high voltage consuming characteristic.

FREDERICK A. MAXFIELD.
LLOYD W. SMEDE.